ABSTRACT

A catalyst formed from
(A) a solid titanium catalyst component containing magnesium, titanium, halogen and a polycarboxylic acid ester as essential ingredients and being obtained by contacting a magnesium compound, a titanium compound and a polycarboxylic acid ester,
(B) an organoaluminum compound, and
(C) an organosilicon compound represented by the following formula (1)

$$SiR^1R^2(OR^3)_2 \qquad (1)$$

wherein $R^1$ is selected from the class consisting of linear alkyl groups having at least 3 carbon atoms and arylalkyl groups in which the alkyl moiety has a secondary or tertiary alpha-carbon atom, $R^2$ is selected from the class consisting of alkyl groups and arylalkyl groups in which the alkyl moiety has a secondary or tertiary alpha-carbon atom, and $R^3$ is a hydrocarbon group, with the proviso that when $R^1$ is a linear alkyl group having at least 3 carbon atoms and $R^2$ is an alkyl group, the alkyl group for $R^2$ is a linear alkyl group having at least 3 carbon atoms, and process for production thereof.

19 Claims, No Drawings

PROCESS FOR POLYMERIZATION OF OLEFINS AND POLYMERIZATION CATALYST

This application is a continuation of application Ser. No. 07/165,909 filed Mar. 9, 1988 and now abandoned.

This invention relates to a process for polymerizing olefins, and to a polymerization catalyst. More specifically, it relates to a process for polymerizing olefins to produce highly stereoregular olefin polymers with industrial advantage, and to a polymerization catalyst.

Previously, various processes have been known for producing a solid catalyst component containing magnesium, titanium, halogen and an electron donor as essential ingredients. It has also been known that when the aforesaid solid catalyst component is used in the polymerization of alpha-olefins having at least 3 carbon atoms, highly stereoregular polymers can be obtained with high catalytic activity.

Japanese Laid-Open Patent Publication No. 83006/1983 discloses a process for polymerizing or copolymerizing olefins in the presence of a catalyst formed from (a) a solid titanium catalyst component containing magnesium, titanium, halogen and a polycarboxylic acid ester and/or a polyhydroxy compound ester as essential ingredients, (b) an organometallic compound of a metal of Groups I to III of the periodic table and (c) an organo-silicon compound having an Si—O—C or Si—N—C bond.

Japanese Laid-Open Patent Publication No. 11705/1987 discloses a process for polymerizing an olefin which comprises bringing the olefin into contact with a catalyst formed from (a') a solid catalyst component containing a magnesium halide and a titanium halide as essential ingredients, (b') an organoaluminum compound and (c') an organosilicon compound represented by the following formula $$R^{11}R^{12}_{3-n}Si(OR^{13})_n$$

wherein $R^{11}$ represents a branched hydrocarbon group, and each of $R^{12}$ and $R^{13}$ represents a branched or linear hydrocarbon group.

Japanese Laid-Open Patent Publications Nos. 138700/1983 (European Patent No. 86645), 138706/1983 (European Patent No. 86644), 138707/1983, 138708/1983, 138709/1983, 138719/1983, and 138715/1983 disclose processes involving using similar catalyst systems to the above-mentioned catalysts. None of these patent documents, however, disclose catalysts comprising as components organosilicon compounds in which at least two alkyl groups with at least 3 carbon atoms are bonded to the silicon atom, or organosilicon compounds in which an arylalkyl group is bonded to the silicon atom.

Japanese Patent Publication No. 23802/1986 discloses a process for polymerizing or copolymerizing olefins in the presence of a catalyst formed from (a") a catalyst ingredient obtained by treating a magnesium dihalide with an electron donor compound and contacting the treated magnesium dihalide with a tetravalent titanium compound with or without an electron donor compound, (b") an organoaluminum compound, (c") an organic carboxylic acid ester, and (d) a compound represented by the following formula $$M(OR^{14})_xR^{15}_yX_z$$

wherein M represents H, Li, Na, K, Mg, Ca, Sr, Ba, Zn, B, Al, Se, Ga, Si, Ge, Sn, Ti or Zr, $R^{14}$ and $R^{15}$ are identical or different and each represents H or an alkenyl, cycloalkyl, aryl or aralkyl group having up to 18 carbon atoms, X is a halogen atom, x is greater than 1, and z is not more than 1, and x+y+z is equal to the atomic valence of M.

This patent document discloses an organosilicon compound having an Si—O bond as one of the electron donor compounds (a").

It is an object of this invention to provide a process for polymerizing olefins.

Another object of this invention is to provide a process for producing an olefin polymer using a catalyst having excellent polymerization activity and stereoregularity and a promoter component composed of a specific organosilicon compound.

Another object of this invention is to provide a process for polymerizing olefins which can give a polymer having excellent particle size, particle size distribution, particle shape and bulk density while maintaining high catalyst activity even after the lapse of a long polymerization period of time.

Another object of this invention is to provide a process for producing an olefin polymer having a regulated melt flow rate with little reduction in stereo-regularity index by using a small amount of hydrogen as a molecular weight controlling agent.

Another object of this invention is to provide a process for polymerizing olefins with enhanced catalytic activity by utilizing a molecular weight controlling agent such as hydrogen.

Another object of this invention is to provide a polymerization catalyst which can be used conveniently in the polymerization process of this invention and can exhibit the excellent effects mentioned above.

Further objects of this invention along with its advantages will become apparent from the following description.

According to this invention, the above objects and advantages of this invention is achieved by a process for polymerizing or copolymerizing olefins in the presence of a catalyst formed from (A) a solid titanium catalyst component containing magnesium, titanium, halogen and a polycarboxylic acid ester as essential ingredients and being obtained by contacting a magnesium compound, a titanium compound and a polycarboxylic acid ester, (B) an organoaluminum compound, and (C) an organosilicon compound represented by the following formula (1)

$$SiR^1R^2(OR^3)_2 \qquad (1)$$

wherein $R^1$ is selected from the class consisting of linear alkyl groups having at least 3 carbon atoms and arylalkyl groups in which the alkyl moiety has a secondary or tertiary alphacarbon atom, $R^2$ is selected from the class consisting of alkyl groups and arylalkyl groups in which the alkyl moiety has a secondary or tertiary alpha-carbon atom, and $R^3$ is a hydrocarbon group, with the proviso that when $R^1$ is a linear alkyl group having at least 3 carbon atoms and $R^2$ is an alkyl group, the alkyl group for $R^2$ is a linear alkyl group having at least 3 carbon atoms.

The solid titanium catalyst component (A) used in this invention is a highly active catalyst component containing magnesium, titanium, halogen and a polycarboxylic acid ester as essential ingredients. The titanium catalyst component (A) contains a magnesium halide having a smaller crystallite size than commercial magnesium halides. It has a specific surface area of usually at least about 50 m²/g, preferably about 60 to about 1,000 m²/g, more preferably about 100 to about 800 m²/g. Furthermore, its composition does not substantially change even when washed with hexane at room temperature. When it is used after it is diluted with a diluent such as an inorganic or organic compound (e.g., a silicon compound, an aluminum compound or a polyolefin), it exhibits high performance even if its specific surface area is lower than the limit described above. Preferably, in the titanium catalyst component (A), the atomic ratio of a halogen/titanium is from about 4 to about 200, especially from about 5 to about 100. The magnesium/titanium atomic ratio is preferably from about 1 to about 100, especially from about 2 to about 50. The component (A) may contain another electron donor, a metal, an element, a functional group, etc. When the catalyst contains the electron donor also, the electron donor/titanium mole ratio is preferably from about 0.1 to about 10, especially from about 0.2 to about 6.

The titanium catalyst component (A) can be prepared, for example, by contacting a magnesium compound (or metallic magnesium), an electron donor and a titanium compound with each other, optionally in the presence of another reaction agent such as a compound of silicon, phosphorus or aluminum.

Examples of the method of producing the titanium catalyst component (A) are disclosed, for example, in the specifications of Japanese Laid-Open Patent Publications Nos. 108385/1975 (U.S. Pat. No. 4,157,435), 126590/1975, 20297/1976 (U.S. Pat. No. 4,157,435), 28189/1976 (U.S. Pat. No. 4,076,924), 64586/1976, 92885/1976 (U.S. Pat. No. 4,085,276), 136625/1976, 87489/1977 (U.S. Pat. No. 4,020,012), 100596/1977, 147688/1977 (U.S. Pat. No. 4,232,139), 104593/1977 (U.S. Pat. No. 4,143,223), 2580/1977 (British Patent No. 1,554,340), 40093/1978 (U.S. Pat. No. 4,490,513) 43094/1978, 135102/1980 (U.S. Pat. No. 4,315,874), 135103/1981, 811/1981 (U.S. Pat. No. 4,330,649), 11908/1981 (European Patent No. 22675), 18606/1981 (U.S. Pat. No. 4,335,015), 83006/1983 (British Patent No. 2,111,066), 138705/1983 (European Patent No. 86645), 138706/1983 (European Patent No. 86644), 138707/1983, 138708/1983, 138709/1983, 138710/1983, 138715/1983, 23404/1985 (U.S. Pat. No. 4,547,476), 21109/1986, 37802/1986, 37803/1986 (U.S. Pat. No. 4,647,550) and 152710/1980 (U.S. Pat. No. 4,393,182). Some preferred methods for producing the titanium catalyst component (A) among them are described below.

(1) A magnesium compound or a complex of a magnesium compound is reacted with a titanium compound which forms a liquid phase under the reaction conditions. Prior to the reaction, the magnesium compound or the magnesium complex may, or may not, be pulverized in the presence or absence of an electron donor, a pulverization aid, etc., and may or may not be pretreated with an electron donor and/or an organoaluminum compound, or a reaction aid such as a halogen-containing silicon compound. In the above method, the electron donor is used at least once.

(2) A liquid form of a magnesium compound having no reducing ability is reacted with a liquid titanium compound in the presence of an electron donor to precipitate a solid titanium complex.

(3) The product of (2) is reacted with a titanium compound.

(4) The product of (1) or (2) is reacted with an electron donor and a titanium compound.

(5) A magnesium compound or a complex of a magnesium compound and an electron donor is pulverized in the presence of a titanium compound with or without an electron donor, a pulverization aid, etc., and the resulting solid is treated with halogen, a halogen compound or an aromatic hydrocarbon. In the above process, the pulverized product may be pre-treated as required with an electron donor and/or an organoaluminum compound or a reaction aid such as a halogen-containing silicon compound, and the electron donor is used at least once.

(6) The product of (1), (2), (3) or (4) is treated with halogen, a halogen compound or an aromatic hydrocarbon.

(7) A reaction product obtained by contacting a metal oxide, dihydrocarbyl magnesium and a halogen-containing alcohol is contacted with a polycarboxylic acid ester and a titanium compound.

(8) A magnesium salt of an organic acid, a magnesium compound such as an alkoxymagnesium or aryloxymagnesium are reacted with a polycarboxylic acid ester, a titanium compound, and/or a halogen-containing hydrocarbon.

Especially preferred are those in which a liquid titanium halide is used, or a halogenated hydrocarbon is used during or after using a titanium compound.

The polycarboxylic acid ester is an electron donor which can be an ingredient constituting the highly active titanium catalyst component (A) in this invention. Suitable polycarboxylic acid esters are those having skeletons of the following formula

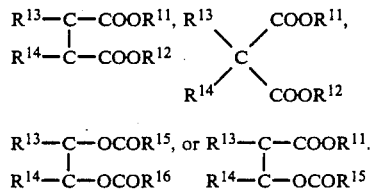

In the formulae, $R^{11}$ represents a substituted or unsubstituted hydrocarbon group; $R^{12}$, $R^{15}$ and $R^{16}$ each represent hydrogen or a substituted or unsubstituted hydrocarbon group, $R^{13}$ and $R^{14}$ represent hydrogen or a substituted or unsubstituted hydrocarbon group (preferably at least one of $R^{13}$ and $R^{14}$ represents a substituted or unsubstitued hydrocarbon group); $R^{13}$ and $R^{14}$ may be linked to each other; and the substituted hydrocarbon groups for $R^{11}$ to $R^{16}$ may include groups containing hetero atoms such as N, O or S, fo example C—O—C, COOR, COOH, OH, SO₃H, —C—N—C—, and NH₂.

Especially preferred are dicarboxylic acid diesters in which at least one of $R^{11}$ and $R^{12}$ is an alkyl group having at least 2 carbon atoms.

Specific examples of preferred polycarboxylic acid esters include aliphatic polycarboxylic acid esters such as diethyl succinate, dibutyl succinate, diethyl methylsuccinate, diisobutyl alpha-methylglutarate, dibutylmethyl malonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monoctyl maleate, di-iso-octyl maleate, di-isobutyl maleate, di-isobutyl butylmaleate, diethyl butylmaleate, di-isopropyl beta-methylglutarate, diallyl ethylsuccinate, di-2-ethylhexyl fumarate, diethyl itaconate, di-isobutyl itaconate, di-isooctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and diethyl; aromatic polycarboxylic acid esters such as monoethyl phthalate, dimethyl phthalate, methylethyl phthalate, monoisobutyl phthalate, diethyl phthalate, ethylisobutyl phthalate, mono-n-butyl phthalate, ethyl-n-butyl phthalate, di-n-propyl phthalate, di-isopropyl phthalate, di-n-butyl phthalate, di-isobutyl phthalate, di-n-heptyl phthalate, di-2-ethylhexyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic acid esters such as 3,4-furanedicarboxylates.

Other examples of the polycarboxylic acid ester that can be supported on the titanium catalyst component include long-chain dicarboxylic acid esters such as ethyl adipate, diisobutyl adipate, diisopropyl sebacate, di-n-butyl sebacate, n-octyl sebacate and di-2-ethylhexyl sebacate.

Preferred polycarboxylic acid esters are those having skeletons of the above-given general formulae. More preferred are esters formed between phthalic acid, maleic acid or a substituted malonic acid and alcohols having at least 2 carbon atoms. Diesters formed between phthalic acid and alcohols having at least 2 carbon atoms are especially preferred.

In supporting the above electron donor, the electron donor need not always to be used as a starting material. It is possible to use a compound capable of being changed into an electron donor in the course of preparing the titanium catalyst component, and convert it into the electron donor during the preparation.

Another electron donor may be present in the titanium catalyst component. If it is present in too large an amount, adverse effects are exerted. Hence, its amount should be limited to a small value.

The magnesium compound used in the preparation of the solid titanium catalyst component (A) in this invention is a magnesium compound with or without reducing ability. Examples of the former are magnesium compounds having a magnesium-carbon bond or a magnesium-hydrogen bond, such as dimethylmagnesium, diethylmagnesium, dipropylmagnesium, dibutylmagnesium, diamylmagnesium, dihexylmagnesium, didecylmagnesium, ethyl magnesium chloride, propyl magnesium chloride, butyl magnesium chloride, hexyl magnesium chloride, amyl magnesium chloride, butylethoxymagnesium, ethylbutylmagnesium and butylmagnesium hydride. These magnesium compounds may be used in the form of complexes with organoaluminum, for example. These magnesium compounds may be in the liquid or solid state. Examples of the magnesium compound without reducing ability are magnesium halides such as magnesium chloride, magnesium bromide, magnesium iodide and magnesium fluoride; alkoxy magnesium halides such as ethoxy magnesium chloride, isopropoxy magnesium chloride, magnesium butoxy chloride and octoxy magnesium chloride; aryloxy magnesium halides such as phenoxy magnesium chloride and methylphenoxy magnesium chloride; alkoxymagnesiums such as ethoxymagnesium, isopropoxymagnesium, butoxymagnesium, n-octoxymagnesium and 2-ethylhexoxymagnesium; aryloxymagnesiums such as phenoxymagnesium and dimethylphenoxymagnesium; and carboxylic acid salts of magnesium such as magnesium laurate and magnesium stearate. The magnesium compound having no reducing ability may be derived from the magnesium compound having reducing ability or may be derived during preparation of the catalyst component. For example, by contacting the magnesium compound with reducing ability with a polysiloxane compound, a halogen-containing silane compound, a halogen-containing aluminum compound, an ester, and an alcohol. The above magnesium compound may be a complex or binary compound with another metal, or a mixture with another metal compound. Of these, magnesium compounds having no reducing ability are preferred. Halogen-containing magnesium compounds, above all mangesium chloride, alkoxy magnesium chlorides and aryloxy magnesium chlorides, are preferred.

In the present invention, tetravalent titanium compounds of the following formula

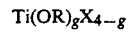

Ti(OR)$_g$X$_{4-g}$ wherein R represents a hydrocarbon group, X represents halogen, and g is a number of 0 to 4, are preferred as examples of the titanium compound used in preparing the solid titanium catalyst component (A). Examples of such compounds include titanium tetrahalides such as TiCl$_4$, TiBr$_4$ and TiI$_4$; alkoxy titanium trihalides such as Ti(OCH$_3$)Cl$_3$, Ti(OC$_2$H$_5$)Cl$_3$, Ti(O n—C$_4$H$_9$)Cl$_3$, Ti(OC$_2$H$_5$) and Ti(O iso-C$_4$H$_9$); alkoxy titanium dihalides such as Ti(OCH$_3$)$_2$Cl$_2$, Ti(OC$_2$H$_5$)$_2$Cl$_2$, Ti(O n—C$_4$H$_9$)$_2$Cl$_2$ and Ti(OC$_2$H$_5$)Br$_2$; trialkoxy titanium monohalides such as Ti(OCH$_3$)$_3$Cl, Ti(OC$_2$H$_5$)$_3$Cl, Ti(O n—C$_4$H$_9$) and Ti(OC$_2$H$_5$)$_3$Br; and tetraalkoxy titaniums such as Ti(OCH$_3$)$_4$, Ti(OC$_2$H$_5$)$_4$ and Ti(O n—C$_4$H$_9$)$_4$. Of these, the halogen-containing titanium compounds, especially titanium tetrahalides, are preferred. Titanium tetrachloride is especially preferred. These titanium compounds may be used singly or as a mixture, or as diluted with a hydrocarbon or a halogenated hydrocarbon.

The amounts of the titanium compound, the magnesium compound and the electron donor to be deposited, and the electron donor which may be used as required such as an alcohol, phenol, and monocarboxylic acid esters, the silicon compound, the aluminum compound, etc. in the preparation of the titanium catalyst component (A) differ depending upon the method of preparation, and cannot be generalized. For example, about 0.01 to 5 moles of the electron donor to be deposited and about 0.01 to 500 moles of the titanium compound may be used per mole of the magnesium compound.

Examples of the catalyst component (B) used together with the catalyst component (A) include:

(i) organoaluminum compounds containing at least one Al—C bond in the molecule, for example organoaluminum compounds of the following formula

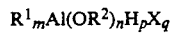

R$^1_m$Al(OR$^2$)$_n$H$_p$X$_q$ wherein R$^1$ and R$^2$ may be identical or different and each represents a hydrocarbon group usually having 1 to 15 carbon atoms, preferably 1 to 4 carbon atoms, X represents halogen, $0<m\leq 3$, $0\leq p\leq 3$, $0\leq q\leq 3$, and $m+n+p+q=3$ and;

(ii) complex alkylated products formed from metals of Group I and aluminum, which are represented by the following formula $$M^1AlR^1_4$$

wherein $M^1$ represents Li, Na or K, and $R^1$ is as defined.

Examples of the organoaluminum compound belonging to (i) include:

compounds represented by the following formula $$R^1_m Al(OR^2)_{3-m}$$

wherein $R^1$ and $R^2$ are as defined above and m is preferably $1.5 \leq m \leq 3$, compounds of the following formula $$R^1_m AlX_{3-m}$$

wherein $R^1$ is as defined, X represents halogen, and m is preferably $0<m<3$, compounds of the following formula $$R^1_m AlH_{3-m}$$

wherein $R^1$ is as defined, and m is preferably $2\leq m<3$, and compounds of the following formula $$R^1_m Al(OR^2)_n X_q$$

wherein $R^1$ and $R^2$ are as defined above, X is halogen, $0<m\leq 3$, $0\leq n<3$, $0<q\leq 3$, and $m+n+q=3$.

Specific examples of the aluminum compounds (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition of the formula $R^1{}_{2.5}Al(OR^2)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; partially hydrogenated alkyl aluminums, for example alkyl aluminum dihydride such as ethyl aluminum dihydride and propyl aluminum dihydride; and partially alkoxylated and halogenated alkyl aluminums such as ethyl aluminum ethoxy chloride, butyl aluminum butoxy chloride, ethyl aluminum ethoxy bromide.

Organoaluminum compounds in which two or more aluminums are bonded via an oxygen or nitrogen, which are similar to the compounds (i) may be used in the same way as in the case of the compounds (i). Examples include $(C_2H_5)_2AlOAl(C_2H_5)_2$, $(C_4H_9)_2AlOAl(C_4H_9)_2$, $$(C_2H_5)_2AlNAl(C_2H_5)_2,$$
$$|$$
$$C_2H_5$$

and methylaluminoxane.

Examples of the compounds (ii) are $LiAl(C_2H_5)_4$ and $LiAl(C_7H_{15})_4$.

Of these, trialkyl aluminums and the compounds in which two or more aluminums are bonded are especially preferred.

The organosilicon compound as catalyst component (C) is represented by the following formula (1)

$$SiR^1R^2(OR^3)_2 \qquad (1)$$

wherein $R^1$ is selected from the class consisting of linear alkyl groups having at least 3 carbon atoms and arylalkyl groups in which the alkyl moiety has a secondary or tertiary alpha-carbon atom, $R^2$ is selected from the class consisting of alkyl groups and arylalkyl groups in which the alkyl moiety has a secondary or tertiary alpha-carbon atom, and $R^3$ is a hydrocarbon group, with the proviso that when $R^1$ is a linear alkyl group having at least 3 carbon atoms and $R^2$ is an alkyl group, the alkyl group for $R^2$ is a linear alkyl group having at least 3 carbon atoms.

Examples of the linear alkyl groups having at least 3 carbon atoms represented by $R^1$ include linear alkyl groups having 3 to 20 carbon atoms such as n-propyl, n-butyl, n-pentyl, n-hexyl, n-heptyl, n-octyl, n-decyl, n-dodecyl, n-tetradecyl, n-hexadecyl, n-octadecyl and n-eicosyl groups. Preferred are those having 3 to 10 carbon atoms, particularly 3 to 6 carbon atoms. The n-propyl group is especially preferred.

The aralkyl groups represented by $R^1$ are those in which the alkyl moiety has a secondary or tertiary alpha-carbon atom. The alkyl moiety having a secondary alpha-carbon atom means a group resulting from substitution of two groups selected from the class consisting of alkyl and aryl groups for the two hydrogen atoms of the methyl group. Likewise, the alkyl moiety having a tertiary alpha-carbon atom means a group resulting from substitution of three groups selected from the class consisting of alkyl and aryl groups for all hydrogen atoms of the methyl group.

The alkyl moiety of the aralkyl groups preferably contain 1 to 8 carbon atoms. Examples of preferred aralkyl groups are 1-phenylethyl, 1-phenylpropyl, cumyl and 1-methyl-1-phenylpropyl groups.

The alkyl group represented by $R^2$ may be linear or branched, and preferably contains 1 to 20 carbon atoms, particularly 1 to 6 carbon atoms. The alkyl group for $R^2$ may therefore be a linear alkyl group having at least 3 carbon atoms. Examples of the linear alkyl group having at least 3 carbon atoms may be the same as those given with regard to $R^1$. Specific examples of the alkyl group $R^2$ include methyl, ethyl, n-propyl, iso-propyl, n-butyl, iso-butyl, sec-butyl, t-butyl, pentyl, hexyl, octyl, decyl, dodecyl, tetradecyl, hexadecyl, octadecyl and eicosyl groups. Preferred alkyl groups have 1 to 6 carbon atoms, and a methyl group is especially preferred.

Examples of the aralkyl group represented by $R^2$ may be the same as those given with regard to $R^1$.

$R^3$ represents a hydrocarbon group such as linear or branched alkyl, cycloalkyl, aryl, or aralkyl group.

Examples of $R^3$ are alkyl groups such as methyl, ethyl, propyl, isopropyl, butyl and hexyl groups; cycloalkyl groups such as cyclopentyl, cyclohexyl and cyclooctyl; aryl groups such as phenyl, tolyl and ethylphenyl groups; and aralkyl groups such as benzyl, cumyl and phenethyl groups. Preferred among these hydrocarbon groups are alkyl groups having 1 to 6 carbon atoms, particularly 1 or 2 carbon atoms. The methyl group is especially preferred.

When in formula (1), $R^1$ is a linear alkyl group having at least 3 carbon atoms and $R^2$ is an alkyl group, the alkyl group for $R^2$ is a linear alkyl group having at least 3 carbon atoms.

Organosilicon compounds of formula (1) in which $R^1$ and $R^2$ are linear alkyl groups having 3 to 6 carbon atoms and $R^3$ is an alkyl group, especially a methyl or ethyl group, and those of formula (1) in which $R^1$ is an aralkyl group and $R^2$ is an alkyl or aralkyl group are preferred.

Examples of the organosilicon compound of formula (1) include
di-n-propyldimethoxysilane,
di-n-butyldimethoxysilane,
di-n-pentyldimethoxysilane,
di-n-hexyldimethoxysilane,
di-n-octyldimethoxysilane,
di-n-decyldimethoxysilane,
di-n-dodecyldimethoxysilane,
di-n-tetradecyldiemthoxysilane,
di-n-hexadecyldimethoxysilane,
di-n-octadecyldimethoxysilane,
di-n-eicosyldimethoxysilane,
di-n-propyldiethoxysilane,
di-n-butyldiethoxysilane,
di-n-pentyldiethoxysilane,
di-n-octyldiethoxysilane,
di-n-decyldiethoxysilane,
di-n-dodecyldiethoxysilane,
di-n-tetradecyldiethoxysilane,
di-n-hexadecyldiethoxysilane,
di-n-octadecyldiethoxysilane,
di-n-eicosyldiethoxysilane,
di-n-propyldipropoxysilane,
di-n-butyldipropoxysilane,
di-n-pentyldipropoxysilane,
di-n-propyldiisopropoxysilane,
di-n-propyldibutoxysilane,
di-n-butyldibutoxysilane,
di-n-hexyldibutoxysilane,
di-n-propyldicyclohexyloxysilane,
di-n-butyldicyclohexyloxysilane,
di-n-propyldicyclooctyloxysilane,
di-n-propyldiphenoxysilane,
di-n-butyldiphenoxysilane,
di-n-pentyldiphenoxysilane,
di-n-hexyldiphenoxysilane,
di-n-propyltolyloxysilane,
di-n-propyldibenzyloxysilane,
di-n-propyldicumyloxysilane,
1-phenylethylmethyldimethoxysilane,
1-phenylpropylmethyldimethoxysilane, cumylmethyldimethoxysilane,
1-phenylethylethyldimethoxysilane,
1-phenylpropylethyldimethoxysilane, cumylethyldimethoxysilane, bis(phenylethyl)dimethoxysilane, bis(phenylpropyl)dimethoxysilane, dibutyldimethoxysilane,
1-phenylethylmethyldiethoxysilane,
1-phenylpropylmethyldiethoxysilane, cumylmethyldiethoxysilane, bis(phenylethyl)diethoxysilane, and dicumyldiethoxysilane.

The process of this invention can be carried out by polymerizing an olefin in the presence of the catalyst components (A), (B) and (C). The amount of the catalyst component (A) used is, for example, about 0.005 to about 0.5 millimole, preferably about 0.01 to about 0.5 millimole, as Ti atoms per liter of the volume of the polymerization zone. The amount of the catalyst component (B) is, for example, about 1 to about 2000 moles, preferably about 5 to about 500 moles, as Al atoms per mole of the Ti atoms in the catalyst component (A) in the polymerization system. The amount of the catalyst component (C) is, for example, about 0.001 to about 10 moles, preferably about 0.01 to about 2 moles, especially preferably about 0.05 to about 1 mole, as Si atoms per mole of the Al atoms in the catalyst component (B).

The catalyst components (A), (B) and (C) may be contacted with one another during or before the polymerization. In the contacting before polymerization, any two of them alone may be contacted, or it is possible to contact portions of two or three of them with one another. The contacting of the components before polymerization may be effected in an atmosphere of an inert gas or in an atmosphere of an olefin.

In the process of this invention, the olefin may be preliminarily polymerized in the presence of the above catalyst prior to the main polymerization of the olefin. The catalyst obtained after the preliminary polymerization has further enhanced polymerization activity and gives a polymer having more improved stereoregularity. In particular, the resulting polymer is in the form of uniform spherical particles and has high bulk density. In the case of the slurry polymerization, the properties of the slurry are excellent. Hence, the powder or the slurry lends itself to easy handling.

The preliminary polymerization is carried out by preliminarily polymerizing about 0.1 to about 500 g, preferably 0.3 to about 300 g, per gram of the catalyst ingredient (A), of the olefin in the presence of at least a portion of the highly active titanium catalyst ingredient (A) and the organoaluminum compound (B). At this time, the organosilicon compound (C) may be partly or wholly present in the reaction system. The amount of the organoaluminum compound (B) to be present may be one sufficient to polymerize the above amount of the olefin per gram of the component (A), and is, for example, about 0.1 to about 100 moles, especially about 0.5 to about 50 moles, for each titanium atom in the highly active titanium catalyst component (A).

Preferably, the preliminary polymerization is carried out under mild conditions in an inert hydrocarbon medium or a liquid monomer. Examples of inert hydrocarbon media used for this purpose include aliphatic hydrocarbons such as propane, butane, pentane, hexane, heptane, octane, decane, dodecane and kerosene, alicyclic hydrocarbons such as cyclopentane, cyclohexane and methylcyclopentane, aromatic hydrocarbons such as benzene, toluene and xylene, and halogenated hydrocarbons such as ethylene chloride and chlorobenzene. The aliphatic hydrocarbons are especially preferred.

The preliminary polymerization may be effected batchwise or continuously. The preliminary polymerization may also be carried out at a temperature much higher than the temperature of the catalyst in the main polymerization system.

The suitable concentration of the highly active titanium catalyst component (A) in the preliminary polymerization treatment is, for example, about 0.01 to about 200 millimoles, preferably about 0.05 to about 100 millimoles, calculated as titanium atoms per liter of the inert hydrocarbon medium. The temperature in the preliminary polymerization treatment is one at which the resulting pre-polymer is substantially insoluble in the medium, and is usually about −20 to about +100° C., preferably about −20 to about +80° C., especially preferably 0 to about +40° C. This treatment can be carried out by feeding a predetermined amount of the olefin into a suspension of the catalyst in the inert solvent. The olefin used for this purpose may be the same as or different from the olefin used in the main polymerization, and may be selected from those olefins which are described hereinafter. Preferably, it is selected from ethylene and alpha-olefins having 3 to 10 carbon atoms so that a highly crystalline polymer may be produced. Propylene, 4-methyl-1-pentene and 1-butene are especially preferred. In the preliminary polymerization, a molecular weight controlling agent such as hydrogen may be caused to be present. The amount of the molecular weight controlling agent is preferably limited to one in which a prepolymer having an intrinsic viscosity $[\eta]$, measured in decalin at 135° C., of at least 0.2 dl/g, preferably about 0.5 to about 10 dl/g, can be produced.

The amount of the olefin preliminarily polymerized is about 0.1 to about 500 g, preferably about 0.3 to about 300 g, per gram of the titanium catalyst component (A). Since an increase in its amount does not correspondingly bring about an increase in effect, it is preferably limited to the above range. If the amount of the preliminary polymerization is too large, molding of the resulting olefin polymer may cause occurrence of fish eyes.

The main polymerization of the olefin is carried out by using the catalyst subjected to the preliminary polymerization treatment together with the catalyst components (B) and (C) if they are not used in the prepolymerization treatment.

In the process of this invention, the polymerization of the olefin is carried out in the vapor phase or in the liquid phase, for example in slurry. In the slurry polymerization, an inert hydrocarbon may be used as a solvent, or the olefin itself may be used as the solvent.

Examples of preferred olefins used in the polymerization are ethylene, propylene, 1-butene, 4-methyl-1-pentene and 1-octene. They may be used not only in homopolymerization but also in random copolymerization or block copolymerization. In the copolymerization, polyunsaturated compounds such as conjugated dienes or non-conjugated dienes may be selected as a comonomer component. Preferably, the process of this invention is applied to the homopolymerization of propylene or 1-butene, or the copolymerization of mixtures of the above olefins and other olefins and containing propylene or 1-butene as a main component (for example, in an amount of at least 50 mole %, preferably at least 70 mole %).

The temperature of olefin polymerization is preferably about 20 to about 200° C., more preferably about 50 to about 180° C., and the polymerization pressure is from atmospheric pressure to about 100 kg/cm², preferably from 2 to about 50 kg/cm². The polymerization may be carried out batchwise, semi-continuously or continuously. The polymerization may be carried out in two or more steps having different reaction conditions.

A polymer having a high stereoregularity index can be produced with a high catalyst efficiency when the process of this invention is applied to the stereoregular polymerization of an alpha-olefin having 3 or more carbon atoms. When the process of this invention is used for olefin polymerization, the use of hydrogen in an attempt to obtain a polymer having a high melt flow rate does not lead to a reduction in stereoregularity index and in activity. Because the catalyst used in the process of this invention is highly active, the yield of the polymer per unit weight of the solid catalyst component is better than in the case of using previously proposed catalyst components in obtaining a polymer having the same stereo-regularity index. Consequently, the catalyst residue in the polymer, particularly its halogen content, can be reduced, and the operation of removing the catalyst can be omitted. Furthermore, in molding the polymers obtained by the process of this invention, the corroding tendency of the mold can be markedly inhibited.

The following examples illustrate the present invention in greater detail.

In the following examples, t-II is a measure of the total isotacticity index of the resulting polymer, and is measured by the following method.

After polymerization, propylene is vaporized to obtain a polypropylene powder, which is then dried. The dried polypropylene powder is subjected to Soxhlet extraction for 6 hours with n-heptane. The amount [B(g)] of that portion of the polymer which is soluble in boiling n-heptane, and the amount A(g) of that portion of the polymer which is insoluble in boiling n-heptane are measured, and t-II is calculated in accordance with the following equation.

$$t\text{-}II(\%) = \frac{A}{A+B} \times 100$$

EXAMPLE 1

Preparation of a solid titanium catalyst component (A)

Anhydrous magnesium chloride (7.14 g; 75 mmoles), 37.5 ml of decane and 35.1 ml (225 mmoles) of 2-ethylhexyl alcohol were reacted at 130° C. for 2 hours to form a uniform solution. Phthalic anhydride (1.67 g; 11.8 mmoles) was added to the solution, and the mixture was stirred at 130° C. for 1 hour to dissolve phthalic anhydride in the uniform solution. The resulting uniform solution was cooled to room temperature, and added dropwise to 200 ml (1.8 moles) of titanium tetrachloride kept at −20° C. over the course of 1 hour. After the addition, the mixed solution was heated to 110° C. over the course of 4 hours. When its temperature reached 110° C., 5.03 ml (18.8 mmoles) of isobutyl phthalate was added, and the mixture was stirred at the above temperature for 2 hours. After the 2-hour reaction, the solid portion was collected by hot filtration. The solid portion was suspended in 275 ml of titanium tetrachloride, and reacted at 110° C. for 2 hours. After the reaction, the solid portion was collected by hot filtration, and washed fully with decane and hexane at 110° C. until no free titanium compound was detected. The solid titanium catalyst component (A) prepared by the above method was stored as a slurry in hexane. Part of the catalyst component (A), however, was dried in order to examine its composition. The resulting solid titanium catalyst component (A) was found to contain 2.5% by weight of titanium, 58% by weight of chlorine, 18% by weight of magnesium and 13.8% by weight of diisobutyl phthalate.

Preliminary polymerization

A 400 ml glass reactor purged with nitrogen was charged with 200 ml of purified hexane, and 20 mmoles of triethyl aluminum, 4 mmoles of di-n-propyldimethoxysilane and 2 mmoles, as titanium atoms, of the titanium catalyst component (A) were introduced into the reactor. Propylene was fed into the reactor at a rate of 5.9 Nl/hour for 1 hour, and 2.8 g of propylene was polymerized per gram of the titanium catalyst component (A). After the preliminary polymerization, the liquid portion was removed by filtration, and the solid portion separated was slurried in decane.

Polymerization

A 2-liter autoclave was charged with 500 g of propylene, and at 60° C., 0.6 mmole of triethyl aluminum, 0.06 mmole of di-n-propyldimethoxysilane and 0.006 mmole, calculated as titanium atoms, of the catalyst component (A) subjected to the above preliminary polymerization were introduced into the autoclave. Furthermore, 2 liters of hydrogen was introduced into the autoclave. The temperature was raised to 70° C., and propylene was polymerized at this temperature for 40 minutes. After drying, the total amount of the polymer yielded was 302 g. The polymer had a boiling n-heptane extraction residue of 98.1% and an MFR of 19.8 dg/min. The polymerization activity at this time was 50,300 g of polypropylene/mmole of Ti.

EXAMPLE 2

Example 1 was repeated except that in the preliminary polymerization, the amount of triethyl aluminum was changed to 6 mmoles from 20 mmoles, and di-n-propyldimethoxysilane was not added. The results are shown in Table 1.

EXAMPLE 3

Preparation of a solid catalyst component (A)

A 2-liter high-speed stirring device (made by Tokushu Kika Kogyo K. K.) was fully purged with nitrogen, and then charged with 700 ml of purified kerosene, 10 g of commercial MgCl$_2$, 24.2 g of ethanol and 3 g of Emasol 320 (a tradename for sorbitane distearate produced by Kao-Atlas Co., Ltd.). With stirring, these materials were heated and stirred at 120° C. for 30 minutes at 800 rpm. Under high-speed stirring, the mixture was transferred by a Teflon tube having an inside diameter of 5 mm into a 2-liter glass flask equipped with a stirrer into which 1 liter of purified kerosene cooled at −10° C. had been introduced. The resulting solid was collected by filtration, and fully washed with hexane to give a carrier.

The carrier (7.5 g) was suspended in 150 ml of titanium tetrachloride at room temperature, and then 1.3 ml of diisobutyl phthalate was added. The mixture was then heated to 120° C., and stirred for 2 hours at 120° C. The solid portion was collected by filtration, suspended in 150 ml of titanium tetrachloride, and stirred at 130° C. for 2 hours. The solid reaction product was collected from the reaction mixture by filtration, and washed with a sufficient amount of purified hexane to give a solid titanium catalyst component (A). This component was found to contain 2.2% by weight of titanium, 63% by weight of chlorine, 20% by weight of magnesium and 5.0% by weight of diisobutyl phthalate.

Preliminary polymerization

A 400 ml glass reactor purged with nitrogen was charged with 200 ml of purified hexane, and then 20 mmoles of triethyl aluminum, 3 mmoles of di-n-propyldimethoxysilane and 2 mmoles, calculated as titanium atoms, of the titanium catalyst component (A) were introduced into the reactor. Propylene was then fed into the reactor at a rate of 5.9 Nl/hour for 1 hour, and 2.8 g, per gram of the titanium catalyst component (A), of propylene was polymerized. After the preliminary polymerization, the liquid portion was removed by filtration, and the separated solid portion was slurried in decane.

Polymerization of propylene

Propylene was polymerized in the same way as in Example 1 except that the catalyst prepared above was used.

EXAMPLE 4

Example 1 was repeated except that di-n-butyldimethoxysilane was used instead of the di-n-propyldimethoxysilane used in Example 1. The results are shown in Table 1.

EXAMPLE 5

Example 1 was repeated except that di-n-hexyldimethoxysilane was used instead of the di-n-propyldimethoxysilane used in Example 1. The results are shown in Table 1.

TABLE 1

| Example | Polymerization activity (g-PP/mM-Ti) | t-II (%) | MFR (dg/min) | Apparent bulk density (g/ml) |
|---|---|---|---|---|
| 1 | 50,300 | 98.1 | 19.8 | 0.47 |
| 2 | 50,600 | 97.8 | 23.1 | 0.47 |
| 3 | 48,700 | 97.7 | 20.6 | 0.46 |
| 4 | 38,900 | 97.1 | 36.3 | 0.46 |
| 5 | 37,300 | 97.2 | 34.6 | 0.46 |

EXAMPLE 6

The same solid titanium catalyst component (A) as prepared in Example 1 was used, and subjected to the same preliminary polymerization as in Example 1 except that 4 mmoles of cumylmethyldimethoxysilane was used instead of 4 mmole of di-n-propyldimethoxysilane.

Polymerization

A 2-liter autoclave was charged with 500 g of propylene, and at 60° C., 0.6 mmole of triethyl aluminum, 0.06 mmole of cumylmethyldimethoxysilane, and 0.006 mmole, calculated as titanium atoms, of the above catalyst component (A) subjected to the preliminary polymerization were introduced into the autoclave. Furthermore, 2 liters of hydrogen was introduced into the autoclave. The temperature was raised to 70° C., and propylene was polymerized for 40 minutes. After drying, the total amount of the polymer yielded was 278 g. The polymer had a boiling n-heptane extraction residue of 98.2%, and an MFR of 32.6 dg/min. Hence, the polymerization activity at this time was 46,300 g of polypropylene/mmole of Ti.

EXAMPLE 7

Example 6 was repeated except that the amount of triethyl aluminum was changed to 6 mmoles from 20 mmoles and cumylmethyldimethoxysilane was not added. The results are shown in Table 2.

EXAMPLE 8

The same solid catalyst component (A) as prepared in Example 3 was used, and subjected to the same preliminary polymerization as in Example 3 except that 4 mmoles of cumylmethyldimethoxysilane was used instead of 4 mmoles of di-n-propyldimethoxysilane.

Propylene was polymarized as in Example 6 except that the above solid catalyst component (A) subjected to preliminary polymerization was used. The results are shown in Table 2.

EXAMPLE 9

Example 6 was repeated except that 1-phenylethylmethyldimethoxysilane was used instead of dicumyldimethoxysilane. The results are shown in Table 2.

EXAMPLE 10

Example 6 was repeated except that 1-phenylethylethyldimethoxysilane was used instead of dicumyldimethoxysilane. The results are shown in Table 2.

TABLE 2

| Example | Polymerization activity (g-PP/mM-Ti) | t-II (%) | MFR (dg/min) | Apparent bulk density (g/ml) |
|---|---|---|---|---|
| 6 | 46,300 | 98.2 | 32.6 | 0.47 |
| 7 | 45,100 | 97.9 | 27.6 | 0.47 |
| 8 | 45,100 | 97.7 | 30.6 | 0.46 |
| 9 | 33,300 | 94.3 | 47.3 | 0.46 |
| 10 | 30,600 | 98.3 | 40.9 | 0.45 |

What we claim is:

1. A process for polymerizing or copolymerizing olefins comprising:
   (1) contacting at least one olefin, under polymerization conditions, with a catalyst formed from
      (A) a solid titanium catalyst component containing magnesium, titanium, halogen and a polycarboxylic acid ester, as essential ingredients, and being obtained by contacting a magnesium compound, a titanium compound and a polycarboxylic acid ester,
      (B) an organoaluminum compound, and
      (C) an organosilicon compound represented by the following formula (1)

$$SiR^1R^2(OR^3)_2 \quad (1)$$

wherein
   $R^1$ is selected from the group consisting of linear alkyl groups having from 3 to 6 carbon atoms and arylalkyl groups in which the alkyl moiety has a secondary or tertiary alpha-carbon atom,
   $R^2$ is selected from the group consisting of alkyl groups and arylalkyl groups in which the alkyl moiety has a secondary or tertiary alpha-carbon atom, and
   $R^3$ is a methyl group, with the proviso that when $R^1$ is a linear alkyl group having from 3 to 6 carbon atoms and $R^2$ is an alkyl group, the alkyl group for $R^2$ is a linear alkyl group having from 3 to 6 carbon atoms; and
   (2) recovering the resultant polymer product.

2. The process of claim 1 wherein the titanium solid catalyst component (A) has a specific surface area of at least 50 m²/g.

3. The process of claim 1 wherein the halogen/titanium atomic ratio of the titanium solid catalyst component (A) is in the range of from 4 to 200.

4. The process of claim 1 wherein the magnesium/titanium atomic ratio in the titanium solid catalyst component (A) is in the range of from 1 to 100.

5. The process of claim 1 wherein the organoaluminum compound (B) is (i) an organoaluminum compound having at least one Al—C bond in the molecule, or (ii) a complex alkyl compound of a metal of Group I of the periodic table and aluminum.

6. The process of claim 1 wherein the organosilicon compound (C) is a compound of formula (1) in which both $R^1$ and $R^2$ are linear alkyl groups having 3 to 6 carbon atoms or a compound of formula (1) in which $R^1$ is an alkyl group and $R^2$ is an arylalkyl group.

7. The process of claim 1 wherein said catalyst contains 1 to 2,000 moles, as aluminum atoms, of the catalyst component (B) and 0.001 to 10 moles, calculated as silicon atoms, of the catalyst component (C), per mole of titanium atoms of the catalyst component (A).

8. The process of claim 1 wherein at least a part of the catalyst component (A) and at least a part of catalyst component (B) are subjected to preliminary polymerization of olefins before they are used for polymerizing or copolymerizing the olefins.

9. The process of claim 2 wherein the titanium solid catalyst component (A) has a specific surface area of about 60 to about 1,000 m²/g.

10. The process of claim 9 wherein the titanium solid catalyst component (A) has a specific surface area of about 100 to about 800 m²/g.

11. The process of claim 3 wherein the halogen/titanium atomic ratio of the titanium solid catalyst component (A) is in the range of from about 5 to about 100.

12. The process of claim 4 wherein the magnesium/titanium atomic ratio in the titanium solid catalyst component (A) is from about 2 to about 50.

13. The process of claim 5 wherein the organoaluminum compound (B) is an organoaluminum compound having at least one Al—C bond in the molecule.

14. The process of claim 13 wherein said organoaluminum compound having at least one Al—C bond is represented by the following formula $$R^4{}_m Al(OR^5)_n H_p X_q$$

wherein
$R^4$ and $R^5$, which may be identical or different, each represents a hydrocarbon group having 1 to 15 carbon atoms,
X represents halogen,
m is a number greater than zero and less than or equal to three,
p is a number greater than or equal to zero,
q is a number greater than or equal to zero, and $$m+n+p+q=3.$$

15. The process of claim 14 wherein said organoaluminum compound having at least one Al—C bond is selected from the group consisting of (i) compounds represented by the following $$R^4{}_m Al(OR^5)_{3-m}$$

wherein m is greater than or equal to 1.5 and less than or equal to three;
(ii) compounds represented by the following formula $$R^4{}_m AlX_{3-m}$$

wherein m is greater than zero and less than three;
(iii) compounds represented by the following formula $$R^4{}_m AlH_{3-m}$$

wherein m is greater than or equal to two and less than three; and
(iv) compounds represented by the following formual $$R^4{}_m Al(OR^5)_n X_q$$

wherein
m is greater than zero and less than or equal to three,
n is greater than zero and less than three,
q is greater than zero and less than three, and $$m+n+q=3.$$

16. The process of claim 5 wherein the organoaluminum compound (B) is a complex alkyl compound of a metal of Group I of the periodic table and aluminum.

17. The process of claim 16 wherein the said complex alkyl compound of a metal of Group I of the periodic table and aluminum is represented by the formula $$M^1 AlR^4{}_4$$

wherein
$M^1$ represents Li, Na or K, and
$R^4$ represents a hydrocarbon group of 1 to 15 carbon atoms.

18. The process of claim 1 wherein
$R^1$ is selected from the group consisting of linear alkyl groups having 3 to 6 carbon atoms and aralkyl groups wherein the alkyl moiety contains 1 to 8 carbon atoms; and
$R^2$ is selected from the group consisting of alkyl groups having 1 to 20 carbon atoms and aralkyl groups wherein the alkyl moiety contains 1 to 8 carbon atoms.

19. A process for polymerizing or copolymerizing olefins comprising:
(1) contacting at least one olefin, under polymerization conditions, with a catalyst formed from
(A) a solid titanium catalyst component containing magnesium, titanium, halogen and a polycarboxylic acid ester, as essential ingredients, and being obtained by contacting a magnesium compound, a titanium compound and a polycarboxylic acid ester,
(B) an organoaluminum compound, and
(C) an organosilicon compound represented by the following formula (1)

$$SiR^1 R^2 (OR^3)_2 \qquad (1)$$

wherein
$R^1$ is a linear alkyl group having from 3 to 6 carbon atoms,
$R^2$ is a linear alkyl group having from 3 to 6 carbon atoms, and
$R^3$ is a methyl group; and
(2) recovering the resultant polymer product.

* * * * *